United States Patent [19]

Shirasaka

[11] Patent Number: 4,660,565
[45] Date of Patent: Apr. 28, 1987

[54] ULTRASONIC IMAGING APPARATUS USING PULSED DOPPLER SIGNAL

[75] Inventor: Toshio Shirasaka, Tochigi, Japan

[73] Assignee: Kabushiki Kaisha Toshiba, Kawasaki, Japan

[21] Appl. No.: 679,265

[22] Filed: Dec. 7, 1984

[30] Foreign Application Priority Data

Dec. 8, 1983 [JP] Japan .................. 58-230668

[51] Int. Cl.[4] .............................................. A61B 10/00
[52] U.S. Cl. ..................................... 128/660; 128/663
[58] Field of Search ............................... 128/660, 663; 73/861.25, 631

[56] References Cited

U.S. PATENT DOCUMENTS

| 3,026,665 | 3/1962 | Hoff ........................... | 192/17 R |
| 4,318,413 | 3/1982 | Iinuma et al. ............... | 128/663 X |
| 4,334,543 | 6/1982 | Fehr ........................... | 128/663 |
| 4,476,874 | 10/1984 | Taenzer et al. ............. | 128/663 |
| 4,554,926 | 11/1985 | Shirasaka ..................... | 128/663 |

Primary Examiner—Kyle L. Howell
Assistant Examiner—Francis J. Jaworski
Attorney, Agent, or Firm—Finnegan, Henderson, Farabow, Garrett & Dunner

[57] ABSTRACT

In an ultrasonic imaging apparatus using pulsed Doppler signal, the amplitudes of the reflected echo signals are decreased in accordance with a depth of the body. The echo signals received by the transducer are detected in the phase detectors in such a manner that the echo signals are mixed with the reference signals whose amplitudes vary in accordance with the distances between the portions in the body and the transducer, over which the reflected echo signals are propagated.

14 Claims, 9 Drawing Figures

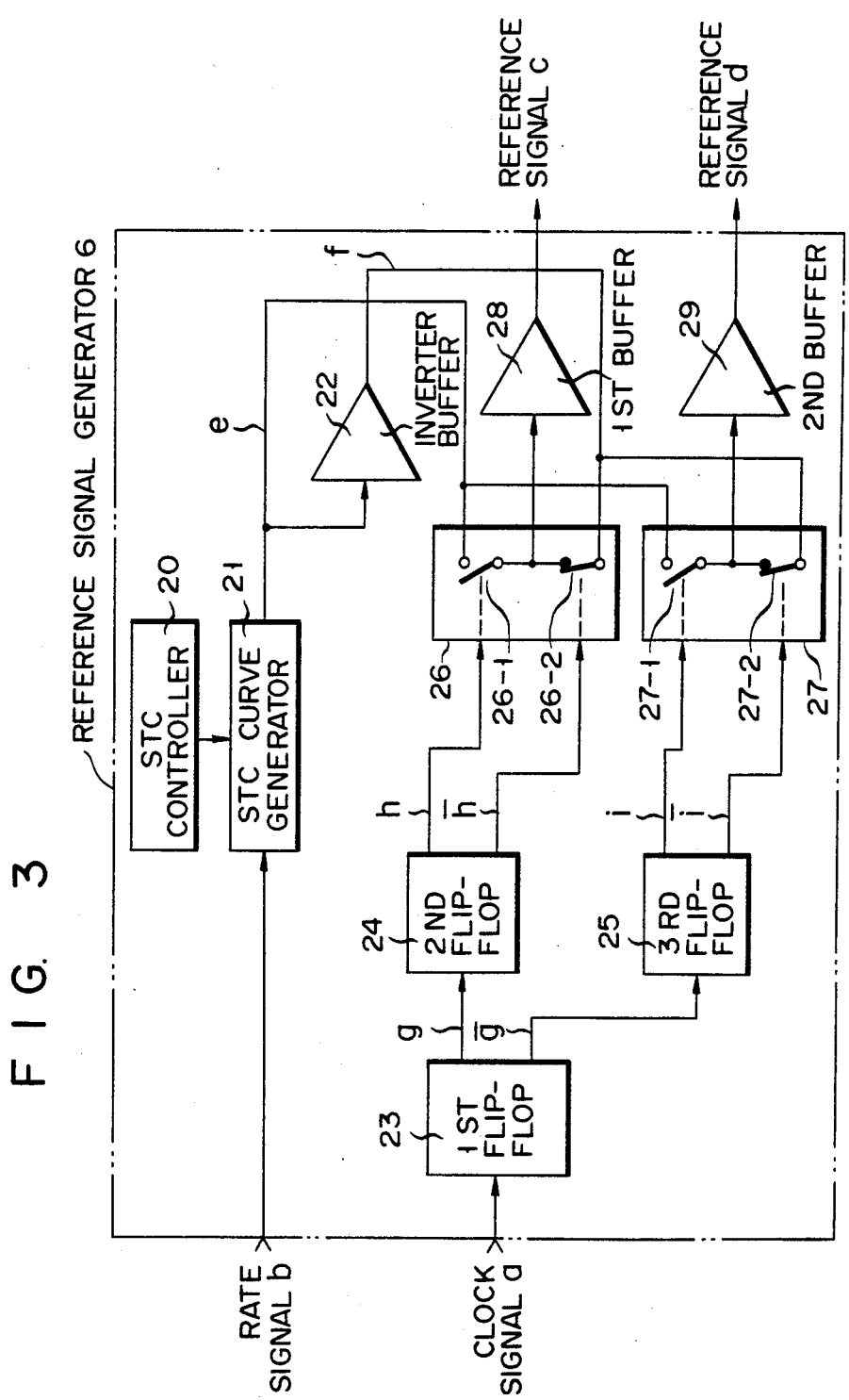
F I G. 3

CLOCK SIGNAL a

RATE SIGNAL b

STC CURVE
SIGNAL &
INVERTED SIGNAL e f

1/2 FREQUENCY-DIVIDED
CLOCK SIGNAL &
INVERTED SIGNAL g $\bar{g}$

1/4 FREQUENCY-
DIVIDED CLOCK
SIGNAL &
INVERTED SIGNAL h $\bar{h}$

1/4 FREQUENCY-
DIVIDED CLOCK
SIGNAL &
INVERTED SIGNAL i $\bar{i}$

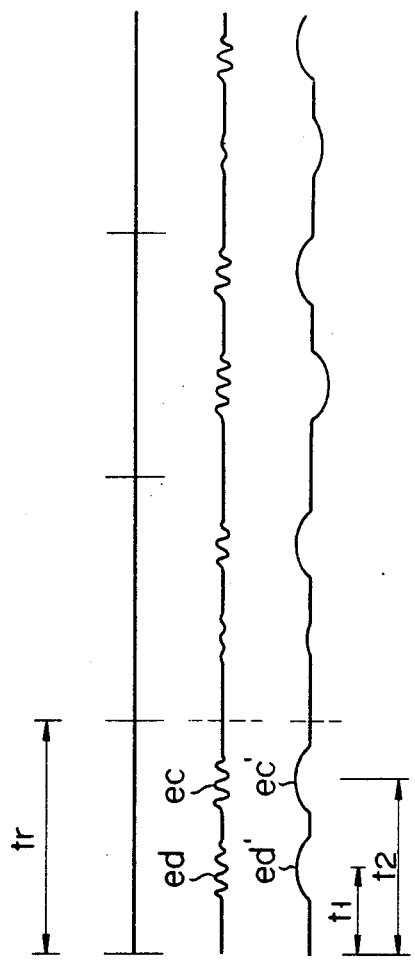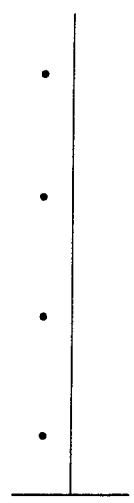
FIG. 7A TRANSMITTER PULSE 7Aa
FIG. 7B RECEIVER SIGNAL 7Ab
FIG. 7C DETECTED SIGNAL 7Ac
FIG. 7D BLOOD-FLOW SIGNAL 7Ba
FIG. 7E CLUTTER SIGNAL 7Bb

ULTRASONIC IMAGING APPARATUS USING PULSED DOPPLER SIGNAL

BACKGROUND OF THE INVENTION

1. Field of the Invention

The present invention relates to an ultrasonic imaging apparatus in which pulsed Doppler signals are compensated in accordance with a propagation distance of reflected ultrasonic beams, i.e., a depth of a body under examination.

2. Description of Prior Art

Very recently, a Doppler detection of pulsed ultrasound has been used to map fluid flows in blood vessels within a body, as described in IEEE TRANSACTIONS ON SONICS AND ULTRASONIC, VOL. SU-17, No. 3, JULY 1970 entitled "Pulsed Ultrasonic Doppler Blood-Flow Sensing."

A basic idea of the conventional ultrasonic imaging apparatus utilizing the Doppler effect is first to transmit pulsed ultrasonic beams toward an object, e.g., the body, by an ultrasonic transducer; Secondly, and then to receive scattered ultrasonic echoes which are Doppler-shifted by the blood-flows in the body by the same transducer, thereby converting them into ultrasonic echo signals represents as electronic signals. A continuous wave (CW) signal having the same fundamental frequency as that of a center frequency (e.g., 2.4 MHz) of the ultrasonic echo signals is mixed with the ultrasonic echo signals, thereby performing phase detection by a low pass filter.

The detected phase difference signal is sampled and passed through a band-pass filter to obtain a Doppler shift signal based on movements of blood-flow in the object.

The Doppler shift signal is frequency-analyzed, e.g., by a Fourier transform device, to obtain power distribution of a spectrum, i.e., a spectrum of a given sample volume having a predetermined power of blood flow at a desired position. The power distribution is displayed on a display device in such a manner that time elapse is plotted along the abscissa, a Doppler shift frequency (proportional to a blood flow rate) is plotted along the ordinate, and an intensity of the power distribution of the spectrum is represented by the brightness.

In the ultrasonic imaging apparatus of this type, the amplitudes of the ultrasonic echo signals reflected from portions of the body decrease in correspondence with time elapse, due to attenuation in the depth of the body and dispersion of the ultrasonic echoes. Therefore, these amplitudes gradually become small in accordance with the distances between the portions within the body and the transducer over which the reflected ultrasonic beams (echoes) are propagated. For this reason, in order to obtain useful Doppler shift data, the amplification ratio of the receiver must be changed in conformance with time elapse or with the depth direction of the body in correspondence with a decrease in the amplitude of the reflected echo signal.

However, the center frequency of the ultrasonic echo signal varies widely, e.g., 2 to 5 MHz, and a dynamic range thereof falls in the order of 100 dB. Therefore, the receiver for receiving such ultrasonic echo signals must contend with technical problems, resulting in complex circuitry.

The present invention has been made in consideration of the above situation, and has as its object to provide an ultrasonic imaging apparatus in which an amplitude of an ultrasonic echo signal having wide dynamic range and frequency characteristics can be easily compensated with the propagation distances of the reflected echoes.

SUMMARY OF THE INVENTION

The object of the present invention may be accomplished by providing an ultrasonic imaging apparatus comprising:

a pulse generator for generating pulse signals to be used as exciting pulse signals and also clock signals;

a transducer including a transducer element to which the exciting pulse signals are applied so as to produce ultrasonic beams therefrom, and from which echo signals are derived, the echo signals being produced by the ultrasonic beams that have been reflected from portions in a body under examination;

a signal generator for generating reference signals whose amplitudes vary in accordance with distances between the portions in the body and the transducer, over which the reflected ultrasonic beams are propagated;

a detector for phase-detecting the echo signals derived from the transducer based upon the reference signals so as to obtain phase difference signals;

a processor for processing the phase difference signals so as to obtain Doppler shift signals; and a device for displaying blood-flow patterns of blood cells in the body from the Doppler shift signals.

Further, the imaging apparatus, according to the invention, for observing blood-flow patterns in combination with a tomographic image by the use of ultrasonic beams comprising:

a pulse generator for generating pulse signals to be used as exciting pulse signals and also clock signals;

a transducer including a transducer element to which the exciting pulse signals are applied so as to produce the ultrasonic beams therefrom, and from which echo signals are derived, the echo signals being produced by the ultrasonic beams that have been reflected from portions in a body under examination;

a signal generator for generating reference signals whose amplitudes vary in accordance with distances between the portions in the body and the transducer means, over which the reflected ultrasonic beams are propagated;

first processor for processing the echo signals derived from the transducer so as to obtain a tomographic image signal;

a detector for phase-detecting the echo signals derived from the transducer based upon the reference signals so as to obtain phase difference signals;

second processor for processing the phase difference signals so as to obtain a two-dimensional blood-flow image signal; and a device for displaying blood-flow patterns of blood cells in the body in combination with a tomographic image thereof from the two-dimensional blood-flow image signal and the tomographic image signal.

According to the present invention, an ultrasonic echo signal having wide dynamic range and frequency characteristics is mixed with a reference signal whose amplitude varies in accordance with a depth of a body so as to perform a phase direction. Therefore, the reflected ultrasonic echo signals whose amplitude attenuation is compensated in accordance with a depth of a body can be obtained.

BRIEF DESCRIPTION OF THE DRAWINGS

The invention is best understood by reference to the accompanying drawings, in which:

FIG. 3 shows a block diagram of an internal circuit of the reference signal generator shown in FIG. 1;

FIG. 7 is a timing chart of various signals used in the apparatus shown in FIG. 5;

DETAILED DESCRIPTION OF THE PREFERRED EMBODIMENTS

Before proceeding with the various types of the preferred embodiments, a fundamental operation of an ultrasonic imaging apparatus according to the invention will now be described.

The ultrasonic echo signals received by the transducer are detected in the phase detectors in such a manner that the echo signals are mixed with the reference signal whose amplitude changes in accordance with the depth of the object under examination, i.e., the distances between the portions within the body and the transducer over which the reflected echoes are propagated.

Figure 1:
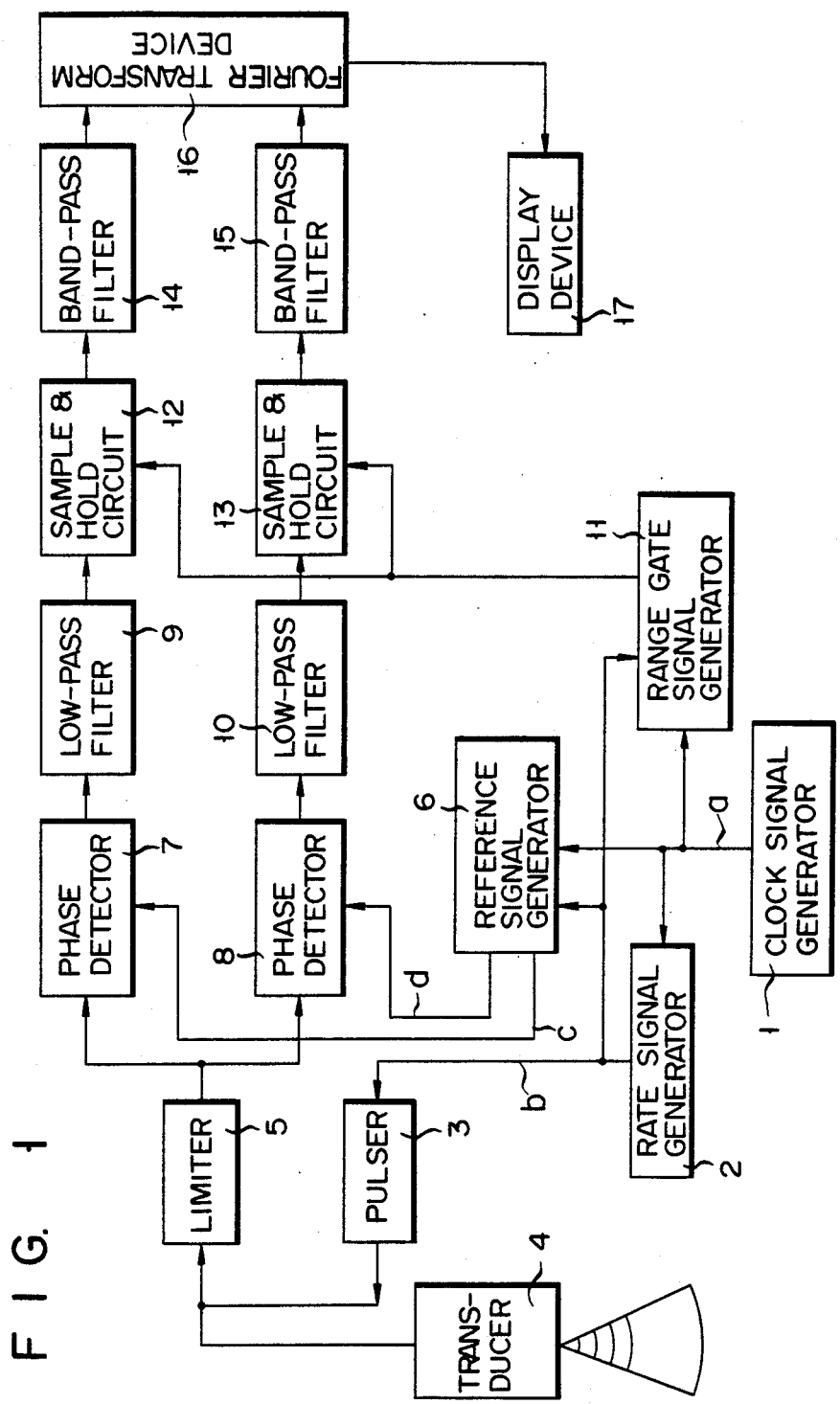
FIG. 1 shows a block diagram of an ultrasonic imaging apparatus according to one preferred embodiment.

In FIG. 1, an ultrasonic imaging apparatus according to one preferred embodiment is shown. A clock signal generator 1 is provided.

A clock signal a having a predetermined period generated from the clock signal generator 1 is supplied to a rate signal generator 2, a reference signal generator 6 and a range gate signal generator 11.

Figure 2:
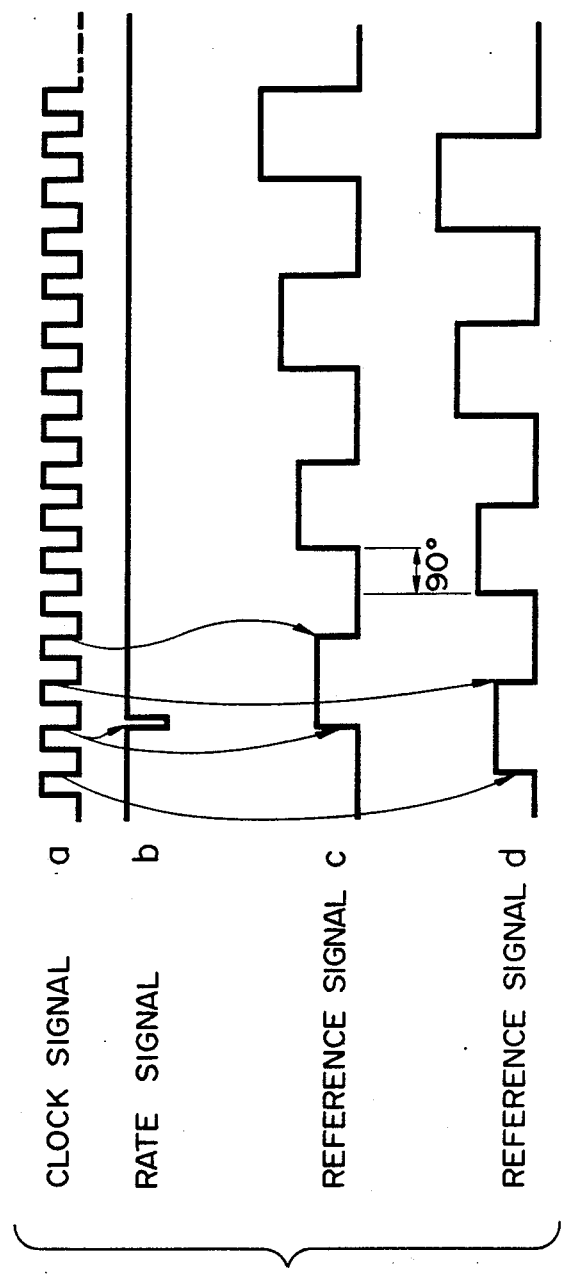
FIG. 2 is a timing chart of clock signal and reference signals used in the apparatus shown in FIG. 1.
Figure 4A:
FIG. 4 is a timing chart of various signals used in the apparatus shown in FIG. 1.
Figure 4B:
Figure 4C:
Figure 4D:
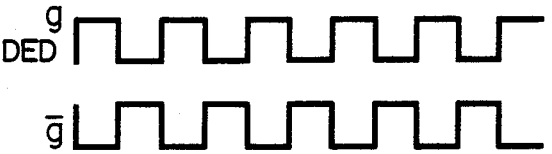
Figure 4E:
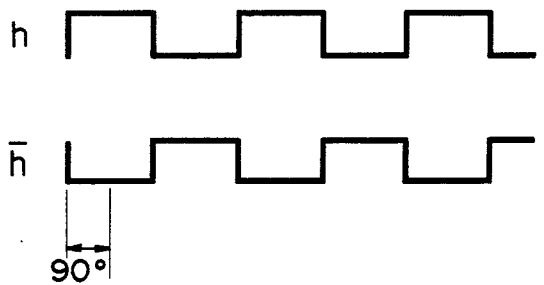
Figure 4F:
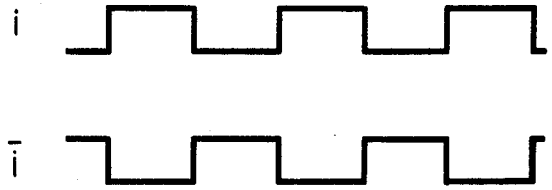

The rate signal generator 2 supplies a rate signal b to a pulser 3 based on the clock signal a (see FIG. 2).

The pulser 3 electrically excites a transducer 4 by receiving the rate signal b. The transducer 4 transmits ultrasonic beams toward a body (not shown), and the ultrasonic beams propagate or penetrate portions in the body. The ultrasonic beams are reflected by these portions, such as blood vessels, as ultrasonic echoes. The ultrasonic echoes are then received by the transducer 4.

The same transducer 4 converts the received ultrasonic echoes into ultrasonic electronic echo signals.

The ultrasonic echo signals are limited below a predetermined signal level by a limiter 5, and only the signal components corresponding to the ultrasonic echoes from the body are respectively supplied to phase detectors 7 and 8 for constituting a quadrature detector.

Reference signals c and d having a frequency corresponding to a center frequency f0 of the ultrasonic beams are mixed with the ultrasonic echo signals in the phase detectors 7 and 8, thereby performing quadrature detection therein.

The reference signals c and d will now be described.

The reference signal generator 6 generates the reference signals c and d in response to the clock signal a from the clock signal generator 1 and the rate signal b from the rate signal generator 2.

The reference signals c and d have a phase difference of 90 degrees, as shown in FIG. 2. This is because these reference signals are used in the quadrature detection.

When the ultrasonic echo signal supplied to the phase detectors 7 and 8 is given as V(f), and the former reference signal c is given as $A \cdot \sin(\omega t)$, an output V1 of the phase detector 7 is represented as follows:

$$V1 = V(f) \cdot A \cdot \sin(\omega t) \tag{1}$$

When the reference signal d is given as $A \cdot \cos(\omega t)$, an output V2 of the latter phase detector 8 is represented as follows:

$$V2 = V(f) \cdot A \cdot \cos(\omega t) \tag{2}$$

where A is an amplitude of the reference signals c and d, $\omega = 2\pi f O$, and t is time.

As is apparent from the equations (1) and (2), the amplitude of the outputs of the phase detectors 7 and 8 including the ultrasonic echo signal can be changed by adjusting the amplitude A of the reference signals c and d.

Therefore, when the reference signals c and d whose amplitude is changed over time elapse, i.e., along a depth direction of the body, are transmitted to the phase detectors 7 and 8, respectively, attenuation of the ultrasonic echo signals along the depth direction of the body can be compensated, thereby preventing S/N (signal-to-noise) degradation. The depth of the body may be defined by distances between the various portions in the body and the transducer 4, over which the reflected echo beams are propagated.

The reference signal generator 6 which generates the reference signals c and d will be described in more detail with reference to a block diagram of FIG. 3 and a timing chart of FIG. 4.

In the reference signal generator 6 shown in FIG. 3, a sensitivity time control (STC) curve generator 21 generates an STC curve signal e whose level (amplitude) changes over time in response to the rate signal b and a control signal from an STC controller 20 which arbitrarily controls the STC curve. The STC curve signal e has a level which increases over time. The STC curve signal e is inverted by an inverter buffer 22 so as to obtain an inverted STC curve signal f which is supplied to switches 26-2 and 27-2 of analogue switches 26 and 27, respectively.

The STC curve signal e is also supplied to first and second analogue switches 26 and 27 at the same time.

Meanwhile, the clock signal a is supplied to a first flip-flop 23 of the reference signal generator 6. It should be noted that the frequency of the clock signal a is selected to be four times the center frequency f0 of the ultrasonic echo signal. The reason is that a second or third flip-flop 24 and 25 is connected to the output terminal of the first flip-flop 23, and the clock signal a is ¼ frequency-divided by these two stage flip-flops (23, 24; 23, 25).

The first flip-flop 23 produces a ½ frequency-divided clock signal g of the clock signal a and an inverted ½ frequency-divided clock signal $\bar{g}$ thereof.

The ½ frequency-divided clock signal g is thereafter supplied to the second flip-flop 24. The second flip-flop 24 produces a ¼ frequency-divided clock signal h which is obtained by ½ frequency-dividing the signal g by its rising edge. Flip-flop 24 and also generates an inverted ¼ frequency-divided clock signal $\bar{h}$ of the signal h.

The signals h and $\bar{h}$ are supplied to the first analogue switch 26. When the signal h is at H level, the switch 26-1 of the first analogue switch 26 is turned on, and the STC curve signal e is thus supplied to a first buffer 28 through the switch 26-1. On the other hand, when the signal $\bar{h}$ is at H level, the switch 26-2 of the first analogue switch 26 is turned on, and the inverted STC curve signal f is transferred to the buffer 28 through the switch 26-2.

The signals h and $\bar{h}$ are the inverse of each other and the frequency thereof corresponds to ¼ that of the clock signal a, therefore the frequency of h and $\bar{h}$ is the same frequency as the center frequency fO of the ultrasonic echo signal. For this reason, the signals e and f can be switched at a frequency identical to the center frequency fO and the switched signal is supplied to the buffer 28. The buffer 28 converts an impedance of the input signal, and generates the reference signal c whose amplitude is increased over the time elapse and whose frequency corresponds to the center frequency fO of the phase detector 7.

Meanwhile, the inverted ½ frequency-divided clock signal $\bar{g}$ is supplied to the third flip-flop 25. The signal $\bar{g}$ is ½ frequency-divided by is rising edge, i.e., the trailing edge of the ½ frequency-divided clock signal g, thereby generating a ¼ frequency-divided clock signal i and an inverted ¼ frequency-divided clock signal $\bar{i}$ of the signal i.

The signals i and $\bar{i}$ are supplied to the second analogue switch 27. When the signal i is at H level, the switch 27-1 of the second analogue switch 27 is turned on and the signal e is supplied to a second buffer 29 through the switch 27-1.

On the other hand, when the signal $\bar{i}$ is at H level, the switch 27-2 of the second analogue switch 27 is turned on, and the inverted STC curve signal f is supplied to the buffer 29 through the switch 27-2.

The signals i and $\bar{i}$ are the inverse of each other and their frequency corresponds to ¼ that of the clock signal a and thus to the center frequency fO of the ultrasonic echo signal. In addition, the signals i and $\bar{i}$ respectively have a phase difference 90 degrees with respect to the signals h and $\bar{h}$.

Therefore, the signals e and f are switched by the switch 27-1 at a frequency identical to the center frequency fO, and the switched signal is supplied to the second buffer 29.

The buffer 29 converts an impedance of the signals e and f, and supplies the reference signal d to the phase detector 8. The amplitude of the signal d is increased over the time elapse and the frequency thereof corresponds to the center frequency fO. In addition, the phase of the signal d is different from that of the signal c by 90 degrees.

In this manner, the phase difference between the ultrasonic echo signals is detected by the phase detectors 7 and 8, and the signal attenuation along the depth direction of the body can be compensated.

Phase difference signals generated from the phase detectors 7 and 8 are supplied to sample-hold circuits 12 and 13 after filtering out high frequency components by low-pass filters 9 and 10. The phase difference signals are sampled at a timing of the range gate signal generated from the range gate signal generator 11 in response to the clock signal a and the rate signal b.

When the sampled phase difference signals are passed through band-pass filters 14 and 15, a clutter signal component reflected from fixed portions of the body, such as blood vessels, is filtered out. As a result, a Doppler shift signal corresponding to blood flow as the object can be detached. The Doppler shift signal is frequency-analyzed by a Fourier transform device 16, and is displayed on a display device 17 in such a manner that the intensity of a power distribution of the spectrum of the sample volumes in the blood flow is represented by a luminance. Time elapse is plotted along the abscissa and the Doppler shift frequency (proportional to the blood flow rate) is plotted along the ordinate.

Figure 5:
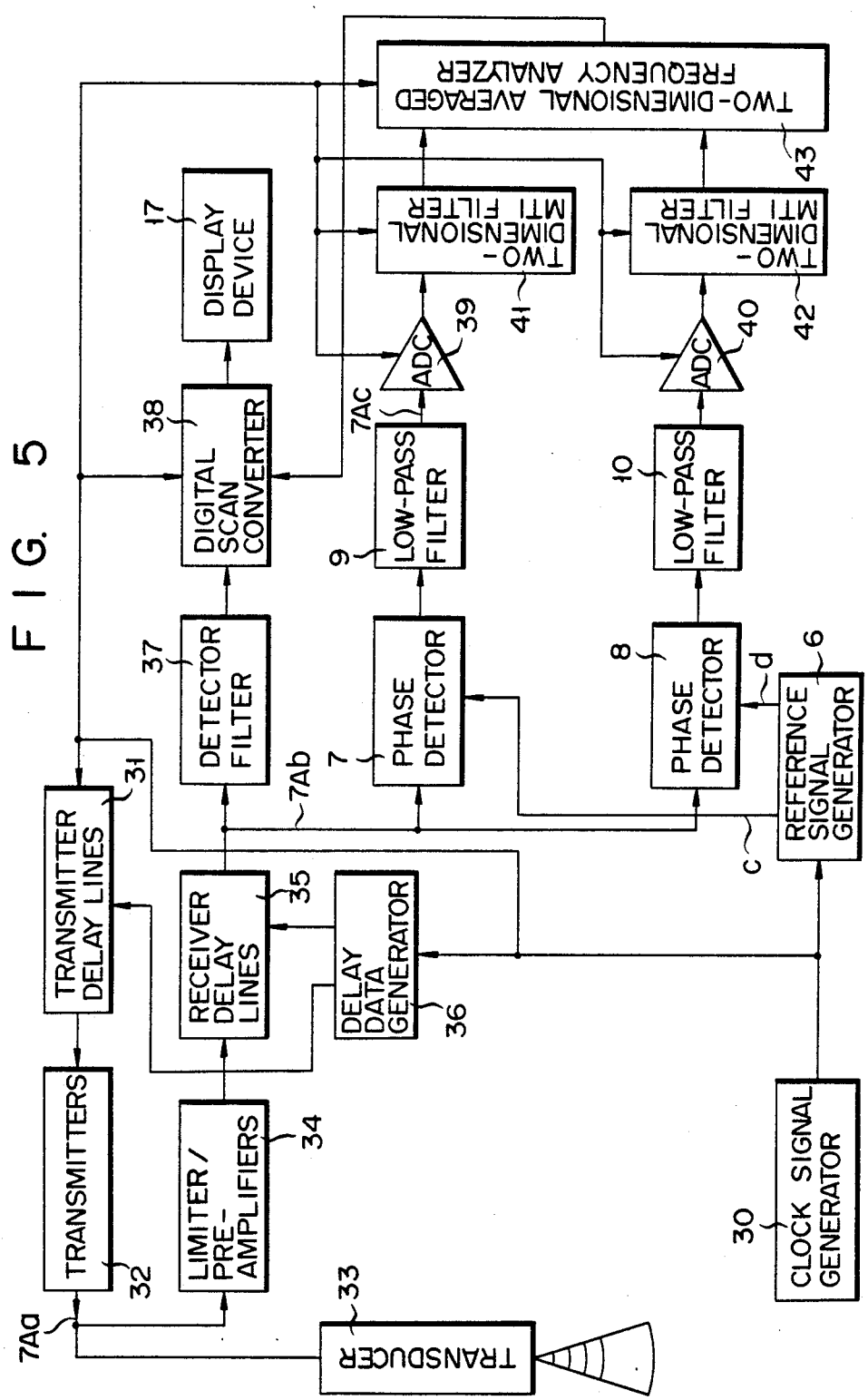
FIG. 5 shows a block diagram of a two-dimensional blood-flow imaging apparatus according to a second preferred embodiment.

In FIG. 5, a two-dimensional blood-flow imaging apparatus according to a second embodiment is shown.

It should be noted that the same reference numerals shown in FIG. 1 will be employed as those for denoting the same circuit elements shown in FIG. 5.

In FIG. 5, a delay data generator 36 generates steering delay data for transmitting ultrasonic beams in response to a clock signal from a clock generator 30. In accordance with the delay data, transmitter delay lines 31 generate pulse trains having a delay time required for steering the ultrasonic beams transmitted toward an object (not shown) from a transducer 33. These pulse trains are converted into signals having a predetermined voltage and current required for driving the transducer 33 by means of a transmitter 32, thereby exciting the transducer 33. Thus, ultrasonic echoes reflected from the object are received by the transducer 33 and converted into echo signals. Thereafter, pulse components of the echo signals are limited by a limiter/preamplifier 34, and the limited echo signals are amplified. The echo signals are supplied to receiver delay lines 35 and beam steering conditions thereof in the reception mode are set in the same state as that in the transmission mode in accordance with the delay data generated from the delay data generator 36. The output signal of the receiver delay lines 35 is applied to the detector filter 37 and is detected, and applied to a digital scan converter 38 as a tomographic echo image reference signal.

On the other hand, the output signals of the receiver delay lines 35 are multiplied, or mixed, with reference signals generated from a reference signal generator 6 in phase detectors 7 and 8 in order to detect a Doppler shift signal. Thus, phase difference signals with respect to the reference signals are generated. This is the same quadrature detection as in the embodiment described above. To detect the Doppler shift signal, the ultrasonic beams must be fixed in the same transmission direction by several raster signals.

Figure 6:
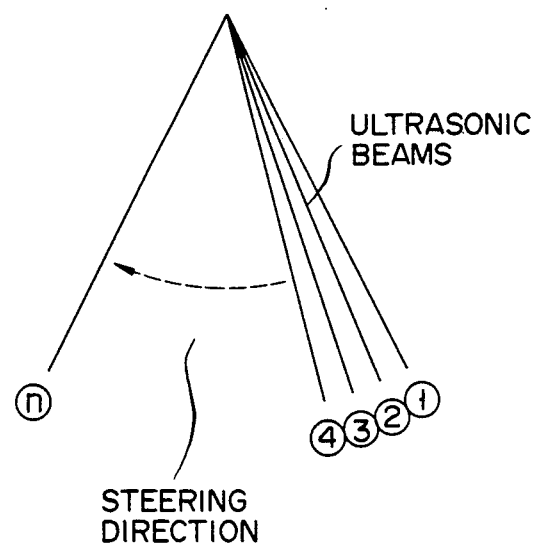
FIG. 6 is an illustration for explaining the steering of the ultrasonic beams.

FIG. 6 shows a method for steering the ultrasonic beams. The ultrasonic beams repeatedly scan at a raster position ① n times, and are steered to a raster position ② so as to repeatedly scan n times there.

FIG. 7 shows signal waveforms for detecting the Doppler shift signal. In FIG. 7, reference symbols +v and −v denote amplitudes of signals. A waveform 7Aa represents a pulsatory transmitter signal, and has a repetition period tr. The output of the receiver delay lines 35 obtained by the above pulsatory transmitter signal is denoted by a waveform 7Ab. In the waveform 7Ab, reference symbol ed denotes a blood-flow signal; and ec, a clutter signal reflected from, e.g., the wall of a heart. The clutter signal is not changed over time with respect to the blood-flow signal. Reference symbol 7Ac represents a waveform which is detected when a high frequency component of the output signal from the phase detector 7 or 8 is filtered out by the filters 9 and 10. The signal represented by the waveform 7Ac is converted into a digital signal by A/D converters 39 and 40 and a clutter signal component ec' is filtered out by two-dimensional MTI filters 41 and 42. The two-dimensional MTI filters 41 and 42 can perform the filtering operation to the raster signals obtained by repeatedly generating the pulsatory transmitter signal.

Figure 8:
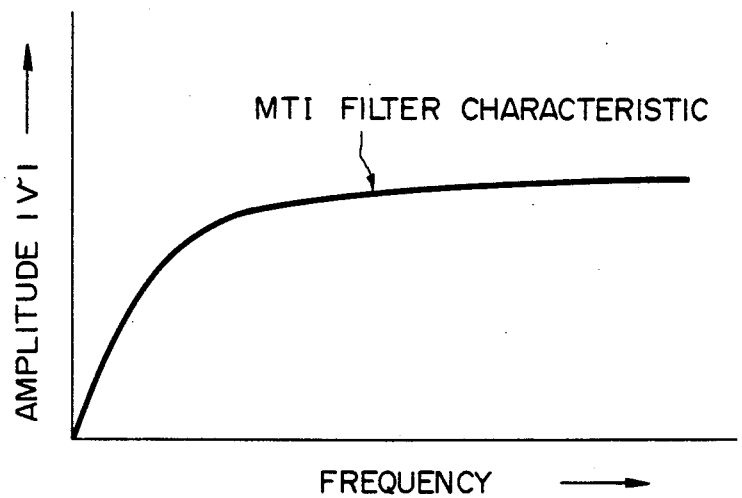
FIG. 8 is a graphic representation of an MTI filter characteristic.

At time periods t1 and t2 starting from the pulsatory transmitter signal, the signals obtained during the period tr of the pulsatory transmitter signal have waveforms 7Ba and 7Bb. It can be seen that the amplitude of the blood-flow signal ed varies as in the waveform 7Ba, while the clutter signal ec does not change. Filter characteristics of the filters 41 and 42 are as shown in FIG. 8. In FIG. 8, reference symbol F denotes a frequency and symbol $|v|$ indicates the absolute value of the amplitude. When the digital-converted detected signal 7Ac is filtered in the filters 41 and 42, the clutter signal components having low frequency can be eliminated.

The output signals of the filters 41 and 42 are averaged at respective scanning points such as t1, t2, or the like with reference to the timing of the pulsatory transmitter signal by means of a two-dimensional averaged frequency analyzer 43. The calculated averaged frequencies are applied to the digital scan converter (DSC) 38, thereby converting the averaged frequencies into corresponding color components. The obtained color components are superimposed on the tomographic image signal as the output signal of the detector filter 37, thereby displaying a tomographic image in combination with the blood-flow patterns on the display device 17.

Figure 9:
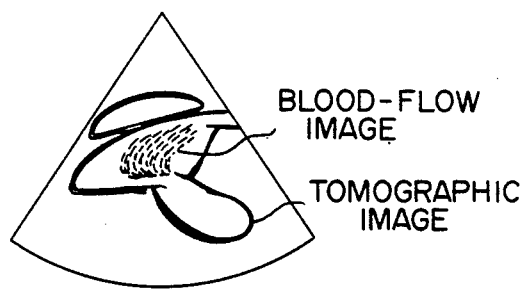
FIG. 9 illustrates a display of blood-flow images superimposed on tomographic image obtained in the apparatus shown in FIG. 5.

FIG. 9 shows two-dimensional blood-flow patterns. In FIG. 9, the solid line represents the tomographic image and the dotted line represents the blood flow patterns.

What is claimed is:

1. An apparatus for imaging blood-flow patterns of a body comprising:
   clock signal generator means for generating clock signals and exciting pulse signals, said clock signal generator means including means for frequency-dividing said clock signals to obtain said exciting pulse signals;
   transducer means responsive to said exciting pulse signals for directing ultrasonic pulses towards said body for receiving ultrasonic echo signals of said ultrasonic pulses reflected from portions of said body at different depths in said body, and for forming electronic echo signals from said received echo signals;
   reference signal generating means for generating reference signals having amplitudes which periodically increase with time in accordance with the time required to receive said ultrasonic echo signals from portions of said body at different depths;
   means coupled to said reference signal generating means and said transducer means for mixing said electronic echo signals and said reference signals to obtain Doppler shift signals; and
   means for processing said Doppler shift signals to display said blood-flow patterns of said object.

2. An apparatus according to claim 1, wherein said mixing means includes a quadrature detector coupled to receive said electronic echo signals and said reference signals, and
   wherein said reference signal generating means includes means for generating two reference signals having a phase difference of 90 degrees.

3. An apparatus according to claim 1 wherein said reference signal generating means includes:
   means for generating basic signals having amplitudes which periodically increase with time; and
   means for switching said basic signals in response to said clock signals to derive said reference signals.

4. An apparatus according to claim 3 further comprising:
   means, coupled to said clock signal generator means, for frequency-dividing said clock signals to derive control signals which are coupled to and control said switching means.

5. An apparatus according to claim 4
   wherein said means for generating said basic signals includes
      a sensitivity time control curve generator for generating said basic signals in response to said exciting pulse signals, and
      a sensitivity time controller coupled to said sensitivity time control curve generator for controlling the generation of said basic signals,
   wherein said switching means includes an analog switch coupled to an output of said sensitivity time control curve generator, and
   wherein said frequency-dividing means includes a flip-flop.

6. An apparatus according to claim 5, wherein said clock signal generator means includes means for generating said clock signals at a frequency approximately four times as great as a center frequency of said echo signals.

7. An apparatus according to claim 1 wherein said processing means includes means for sampling and holding said Doppler shift signals at times corresponding to the times required to receive said ultrasonic echo signals from selected portions of said body.

8. An apparatus according to claim 7
   wherein said reference signal generating means includes means for generating two quadrature reference signals having a phase difference of 90°; and
   wherein said mixing means includes a quadrature detector coupled to said quadrature reference signal generating means.

9. An apparatus for producing images of blood-flow patterns and tomograms of an body comprising;
   an array of ultrasonic transducer elements for directing ultrasonic pulses along a beam towards said body, for receiving echoes of said ultrasonic pulses reflected from different depths of said body along said beam, and for producing electrical echo signals representing said received echoes;
   scanning means, coupled to said array of transducer elements, for steering said beam by exciting said ultrasonic elements at different times;
   a display memory and driver;
   first processing means, coupled to said transducers and to said display memory and driver, for processing said electrical echo signals for transmission to said display memory and driver;
   reference signal generating means for generating reference signals having amplitudes which periodically increase with time in accordance with the time required to receive said echoes from different depths in said body;

detecting means, coupled to said reference signal generating means, for mixing said electrical echo signals and said reference signals to obtain Doppler shift signals;

second processing means, coupled to said detecting means, for producing blood-flow signals from said Doppler shift signals and for transmitting said blood-flow signals to said display memory and driver, said blood-flow signals representing different velocities of blood in said body; and displaying means for reading said echo signals and blood-flow signals from said display memory and driver for displaying said tomogram and said blood-flow pattern of said body.

10. An apparatus according to claim 9, wherein said first processing means includes a detector filter means for detecting said electrical echo signals; and wherein said display memory and driver means includes a digital scan converter means for processing the detected echo signals so as to produce said tomogram.

11. An apparatus according to claim 9 wherein said reference signal generating means includes:

means for generating basic signals having amplitudes which periodically increase with time; and means for switching said basic signals to derive said reference signals.

12. An apparatus according to claim 11 further comprising a means for generating clock signals; and means for frequency-dividing said clock signals to create control signals for controlling said switching means.

13. An apparatus according to claim 12 wherein said means for generating said basic signals includes a sensitivity time control curve generator for generating said basic signals; and a sensitivity time controller coupled to said sensitivity time control curve generator for controlling the generation of said basic signals;

wherein said switching means includes an analog switch; and wherein said frequency-dividing means includes a flip-flop circuit.

14. An apparatus according to claim 13 wherein said means for generating clock signals includes means for generating said clock signals at a frequency four times as great as a center frequency of said electrical echo signals.

* * * * *